United States Patent
Brennan

[11] 3,815,357
[45] June 11, 1974

[54] THRUST REVERSING APPARATUS

[75] Inventor: John M. Brennan, Chula Vista, Calif.

[73] Assignee: Rohr Industries, Inc., Chula Vista, Calif.

[22] Filed: Jan. 28, 1971

[21] Appl. No.: 110,543

[52] U.S. Cl............................... 60/226 A, 244/76 B
[51] Int. Cl......................... F02k 3/02, B64d 31/06
[58] Field of Search.................. 244/76 B; 60/226 A

[56] References Cited
UNITED STATES PATENTS

| | | | |
|---|---|---|---|
| 2,448,167 | 8/1948 | Baak | 244/76 B |
| 2,671,620 | 3/1954 | Andrews | 244/77.13 |
| 3,279,182 | 10/1966 | Helmintoller | 60/226 A |
| 3,483,702 | 12/1969 | Ward | 60/226 A X |

Primary Examiner—William E. Wayner

[57] ABSTRACT

Front fan jet engine has cowl surrounding engine and terminating in jet exhaust nozzle. Elongate streamlined shroud surrounds fan and engine to define annular duct for rearward flow of fan air. Reverser includes peripherally arranged outflow passage means extending through inner and outer walls of shroud forward of its trailing edge. Plurality of sets of control doors are peripherally arranged in the passage means. Each set includes a blocker door at inner wall of shroud pivoted aft to converge forward toward axis of engine, and combination of blocker doors forms frusto-cone when deployed to block rearward flow and divert it laterally to passage means. Each set also includes a deflector door at outer wall of shroud pivoted aft to deploy to forward diverging attitude, and doors combine to form frusto-cone diverging forward to guide diverted stream and introduce forward flow component for reverse thrust. Actuator means are located within shroud aft of the doors and include axially movable carriages. Push-pull links are connected between carriages and doors and lie flush on doors in stowed position. Aft movement of carriages pulls door through links to deployed position with links behind doors, so no part of actuating mechanism interferes with outflow through passages. Controller coupled to air speed meter modulates movement of doors and prevents deployment above predetermined air speed and also increases deployment with reduction of air speed to prevent reingestion.

9 Claims, 8 Drawing Figures

INVENTOR.
JOHN M. BRENNAN

BY

*George E. Pearson*

ATTORNEY

THRUST REVERSING APPARATUS

BACKGROUND OF THE INVENTION

This invention lies in the field of gas turbine engines, commonly called jet engines, which produce reaction thrust by ejecting a high velocity stream of gas from the exhaust nozzle of the gas turbine, and is directed to thrust reversing apparatus for the front fan type of jet engine in which a nacelle or shroud surrounds the engine and is spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the turbine.

As is the case with all jet type engines, the airplanes which are equipped with them have high landing speeds which place a heavy burden on the wheel brakes. To reduce this burden, most such airplanes are provided with means to reverse the direction of flow of the jet stream during landing runs to produce a reverse thrust. Many different types of thrust reversers have been developed and used for this purpose. All of them utilize a basic principle of blocking rearward flow of the jet stream and diverting it laterally and forwardly. One type uses blocker doors swung directly behind the jet nozzle and diverging forwardly. Another type uses openings in the side walls of the nozzle or a surrounding shroud together with blocker doors which swing toward the engine axis to block rearward flow and extend outward to direct the diverted flow laterally and forwardly. Still another type utilizes cascade sets in the side walls of the nacelle or shroud with various means to block rearward flow and uncover the cascades. All of these have various merits and have been used successfully. Their principal problems have been cost, weight, and complexity with resultant high maintenance expense.

SUMMARY OF THE INVENTION

The present invention obtains the benefits mentioned above while providing an apparatus which adds very little weight or complexity, with relatively few machined parts, thus reducing initial cost as well as maintenance expense. Generally stated, the apparatus includes an elongate shroud which surrounds the fan and engine and provides an annular duct for the rearward flow of fan air, the duct terminating forward of the exit end of the exhaust gas nozzle. Peripherally arranged outflow passage means is provided a short distance forward of the trailing edge of the shroud and extends through the inner and outer walls of the shroud. The passage means may comprise several discrete passages, preferably about six to ten, or a single continuous passage with spaced axially extending support structures connecting the aft section of the shroud to the main body.

In either type of passage means there are a plurality of peripherally adjacent sets of control doors. Each set includes a blocker door and a deflector door. The blocker doors are pivotally mounted to the inner wall of the shroud at their aft ends on transverse axes to swing from stowed position in the inner end of the passage means to deployed position converging forwardly toward the engine axis with their forward ends in contact with the engine cowl. In this position, the combined blocker doors are engaged along their side edges to form a frusto-cone which prevents the fan air from flowing rearward out the exit end of the shroud and diverts it gradually and smoothly rearward and outward to the passage means.

The deflector doors of each set are pivotally mounted to the outer wall of the shroud at their aft ends on transverse axes to deploy to forward diverging attitude and they combine to define a frusto-cone diverging forward to guide the diverted stream and introduce a forward flow component for reverse thrust.

An actuator means for each set is located within the shroud behind the doors and includes a drive means such as a screw jack and an axially movable carriage driven by the screw jack. One or more push-pull links are pivotally connected at their aft ends to the carriages and at their forward ends to an intermediate point on the outer surfaces of the doors and lie substantially flush with them in stowed position. When the carriages move aft, the links pull the doors to deployed position, and the actuating mechanism is not located in the outflow passage means at any time.

A plurality of servo motors are also mounted in the shroud and connected to the actuator means to drive them. Power is supplied from any suitable source and a controller is interposed in the circuit to modulate the extent of deployment or stowage. An air speed meter is operatively connected to the controller and the latter acts in response to the meter to determine the extent of deployment of the doors. When the air speed is high enough so that intentional or accidental deployment of the doors would result in their failure or destruction, the meter indication causes the controller to prevent any deployment. Below a safe speed, the response pattern of the controller to the meter will cause deployment of the doors as a reverse function of the speed so that the doors will be fully deployed at some predetermined low speed to avoid reingestion, which may readily occur if the angle of divergence of the deflector doors is relatively acute.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
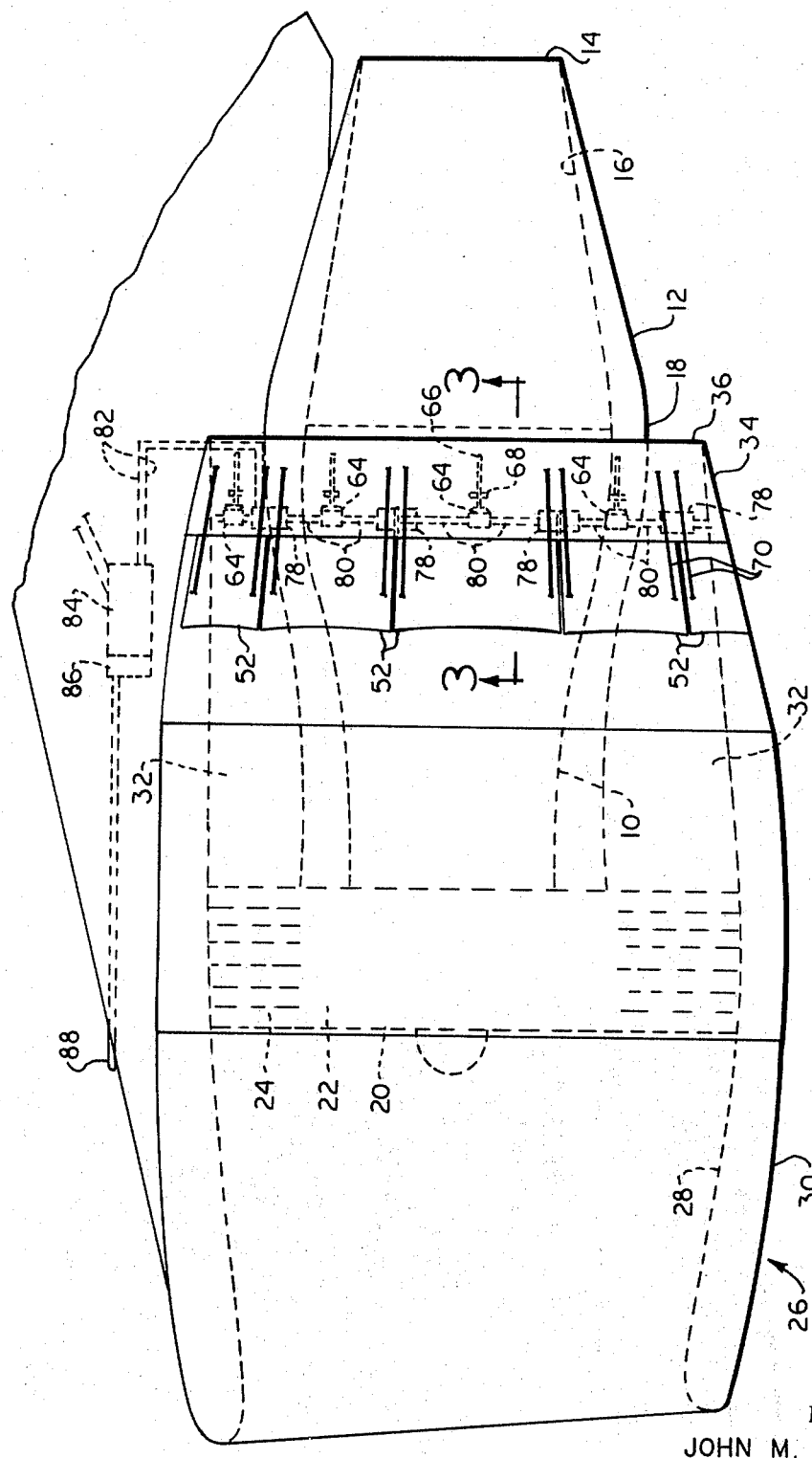
FIG. 1 is a schematic side elevational view of an engine installation incorporating the invention, with the doors in stowed position.
Figure 2:
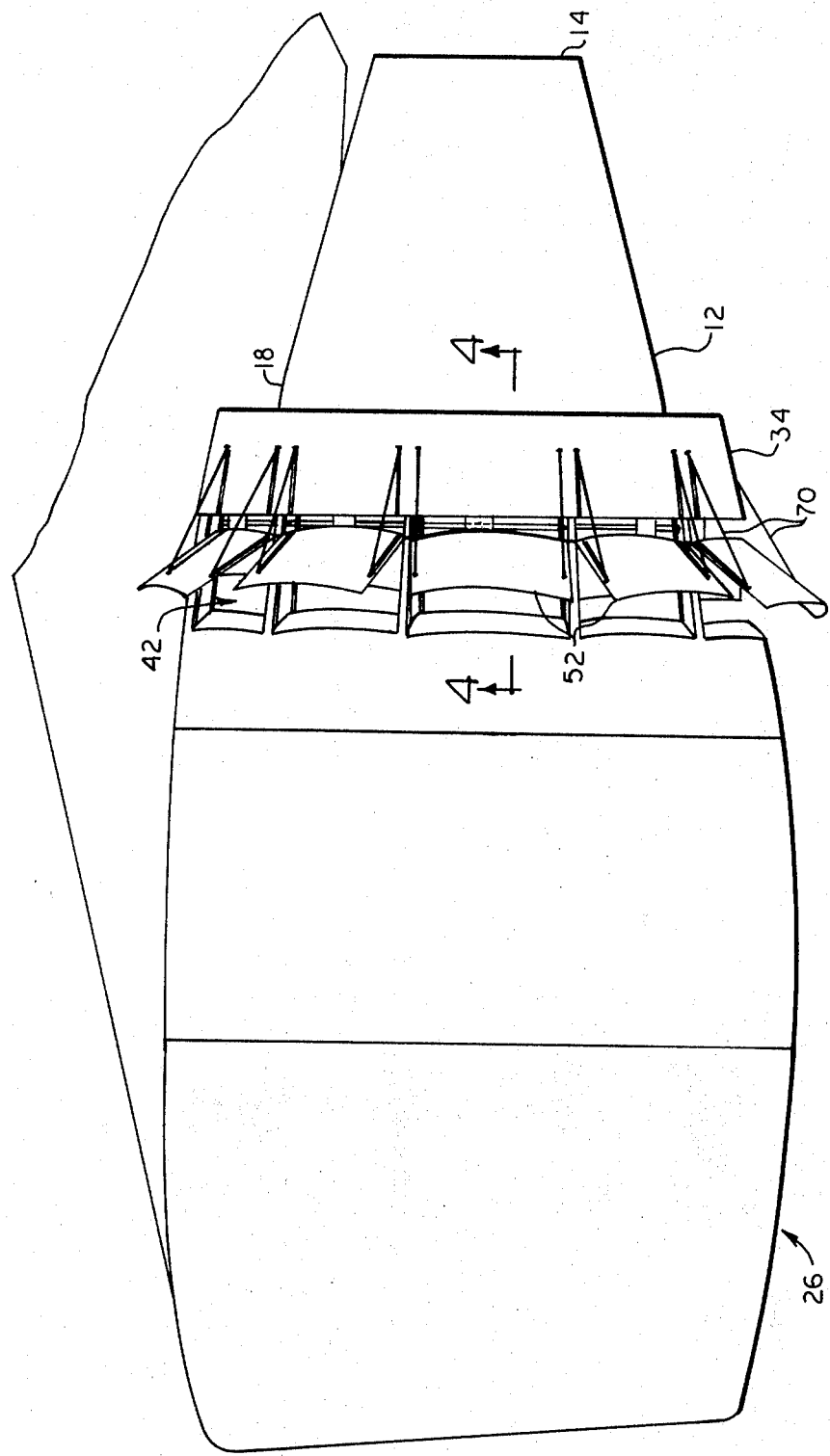
FIG. 2 is a view similar to FIG. 1 with the doors in deployed condition.

The apparatus of this invention is generally schematically illustrated in FIG. 1, in which the engine 10 is encased within a core cowl 12 which terminates rearwardly at the exit 14 of the exhaust gas nozzle or tail pipe 16, the greatest diameter of the cowl being at an intermediate locus 18. At its forward end, the engine is provided with an axial flow compressor or fan 20, the radially inner portion 22 of which directs combustion air into cowl 12 and the radially outer portion 24 of which drives a jet or fan air stream rearward outside of the cowl to directly produce jet thrust. Surrounding the fan and engine is an elongate generally annular shroud 26 having radially spaced inner and outer walls 28 and 30. The inner wall 28 is radially spaced from cowl 12 to form an annular duct 32 for rearward flow of the fan air stream. While a forward fan type is shown, the apparatus is applicable to an aft fan type in the same way.

Figure 3:
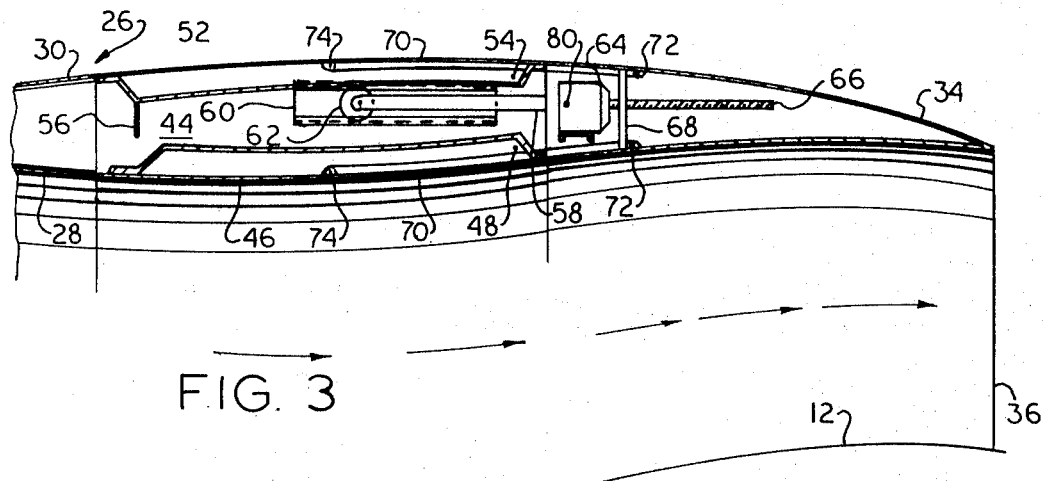
FIG. 3 is a sectional view taken on line 3—3 of FIG. 1.
Figure 4:
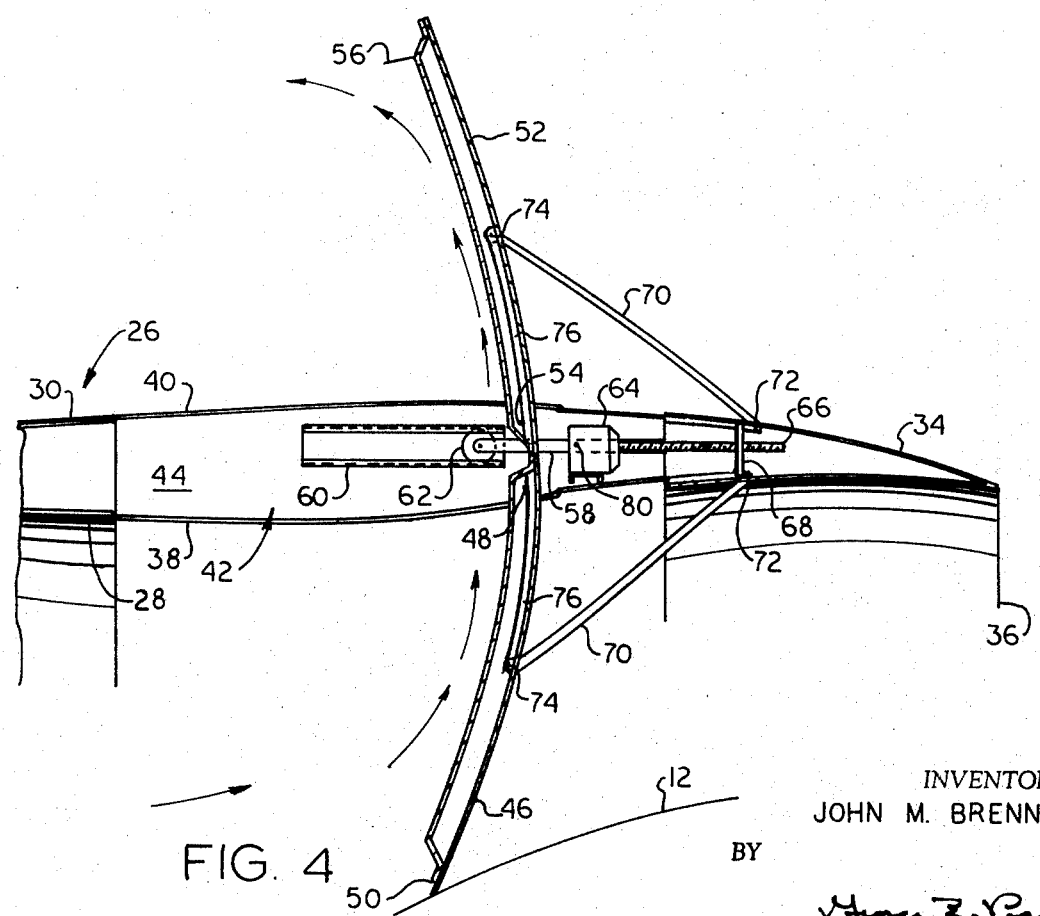
FIG. 4 is a sectional view taken on line 4—4 of FIG. 2.

In the aft section 34 of the shroud, the inner and outer walls converge to form a thin trailing edge 36 defining an air jet nozzle exit in a transverse plane substantially at locus 18. In the zone between aft section 34 and the main body of the shroud openings 38 and 40 are formed through the inner and outer walls to produce outflow passage means 42 for flow of exiting air during reverse thrust operation. This is best shown in FIGS. 3 and 4. While the openings may be separate and distinct and peripherally spaced, the construction in effect constitutes a continuous peripheral passage through the shroud, with structural members 44 supporting the aft portion 34.

In the presently preferred form, the blocking and reversing mechanism includes a plurality of sets of control doors in peripheral adjacency, the blocker doors being mounted to the inner wall and the deflector doors being mounted to the outer wall. Each set comprises a blocker door 46 pivotally mounted at its aft end by pivotal mounting 48 to swing from the stowed position of FIG. 3 in streamline relation with the jet stream to the deployed position of FIG. 4 converging toward the engine axis and with its forward edge 50 in contact with cowl 12. When fully deployed, the blocker doors combine to form a forwardly convergent frusto-cone which blocks air flow through shroud exit 36 and directs the flow gradually and smoothly into outflow passage 42.

Each set also comprises a deflector door 52 pivotally mounted at its aft end by pivotal mounting 54 to swing from the stowed position of FIG. 3 in streamline relation with the relative wind to the deployed position of FIG. 4 diverging forward and extending into the relative wind. All of the doors 52 combine to define a forwardly divergent cone which guides the jet stream outward and introduces a forward flow component to produce reverse thrust. End plates 56 are provided at the outer free ends of doors 52 to intercept the flow and increase the forward flow component.

The aft portion 34 of the shroud is mounted by a plurality of cantilever beams 58 to guide tracks 60 carried by the structural members 44, and fore and aft axial movement is provided by the engagement of rollers 62 in the guide tracks. The actuator means for the doors, one for each set, includes a drive member consisting of gear box 64 and screw jack 66. The carriage 68 threaded on the screw jack is fixedly mounted in shroud aft portion 34 and serves to move it axially. Links 70 are pivotally connected to the carriage at their aft ends by pivots 72 and are pivotally connected at their forward ends to intermediate points of the doors by pivots 74. In the stowed position the links lie substantially flush with the doors and may actually seat in recesses 76.

When carriage 68 is moved rearward by operation of the gear box 64 and jack screw 66, the links 70 pull the doors rearwardly and cause them to swing to deployed position. It will be noted that the actuator means is located within the shroud and that the links are located behind the deployed doors. Consequently, they are not within passage 42 at any time and do not interfere with the flow of the diverted jet stream. This provides greater efficiency and prevents damage to any of the actuator mechanism by the high velocity flow.

While the actuator means may be driven by individual servo motors, or several actuator means may be driven by one servo motor, the presently preferred arrangement is illustrated in FIG. 1. Here it will be seen that a servo motor 78 is located between each two gear boxes 64 around the periphery of the shroud and that all of the devices are interconnected by a series of flexible drive mechanisms 80 which are preferably flexible torsion cables. Thus, each gear box is driven by two servo motors and each servo motor is drivingly connected to two gear boxes. Hence, local failures will not prevent operation of the total mechanism.

One of the dangers to which reversing mechanisms are subject is that they may be "armed" or signaled to deploy at high speeds such as in cruising flight, or in the early stages of letdown. This may be entirely accidental or the result of inadvertence, or the pilot may intentionally but mistakenly signal deployment at too high a speed. If the doors are deployed for any reason at such high speeds, the wind forces are so great that they will be severely damaged or even torn off the airplane.

The system shown schematically in FIG. 1 overcomes this difficulty. Conductors 82 lead from a power source to the various servo motors 78 and the pilot has equipment, not shown, to cause the motors to operate for deployment or stowage. A controller 84 is interposed in the circuitry to modulate the action of the servo motors and it is operatively connected to a flight speed meter 86 and acts in response thereto. The meter in turn is provided with a pilot tube 88 which senses ram air pressure and transmits information to the meter. The response pattern of the controller to the meter is so selected and arranged that when the meter indicates a flight speed above the predetermined safe limit, the controller positively prevents the transmission of any power to the servo motors to produce deployment.

When the system is actuated to produce deployment in the safe low speed range during landing, the first stages of deployment produce a very high degree of forward flow which is desirable for maximum thrust reversal. However, if such attitude is maintained at very low ground speeds it will cause reingestion which may result in flameout or in causing ground debris to flow into the engine inlet. To avoid these difficulties, the controller is further programmed to modulate the extent of deployment as a reverse function of airspeed. Thus, when the speed is high but within the safe range, the doors will be only partially deployed and very high thrust reversal will be obtained. As the airplane continues to slow down, the doors will gradually open to full deployment and the forward vector will be decreased.

FIGS. 5 to 8 illustrate a system basically the same as that shown in FIGS. 1 to 4. One difference is that the aft portion 90 of the shroud is fixedly attached to the main body and is provided with elongate slots 92, FIG. 8, to permit the fore and aft movement of carriage 68 and links 70. The operation is identical except for this feature.

Figure 5:
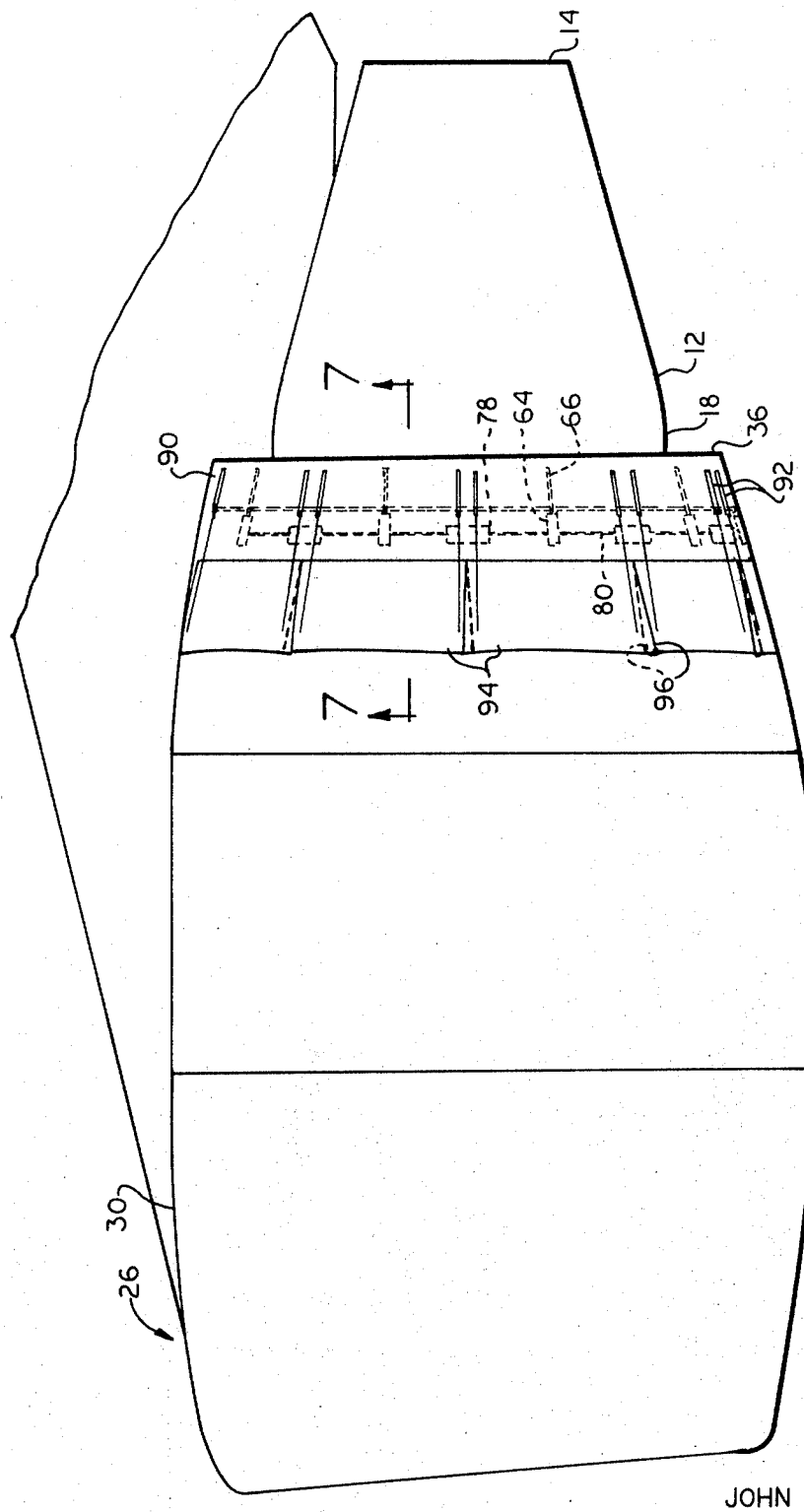
FIGS. 5 to 8 are views corresponding to FIGS. 1 to 4 but illustrating a modification.
Figure 6:
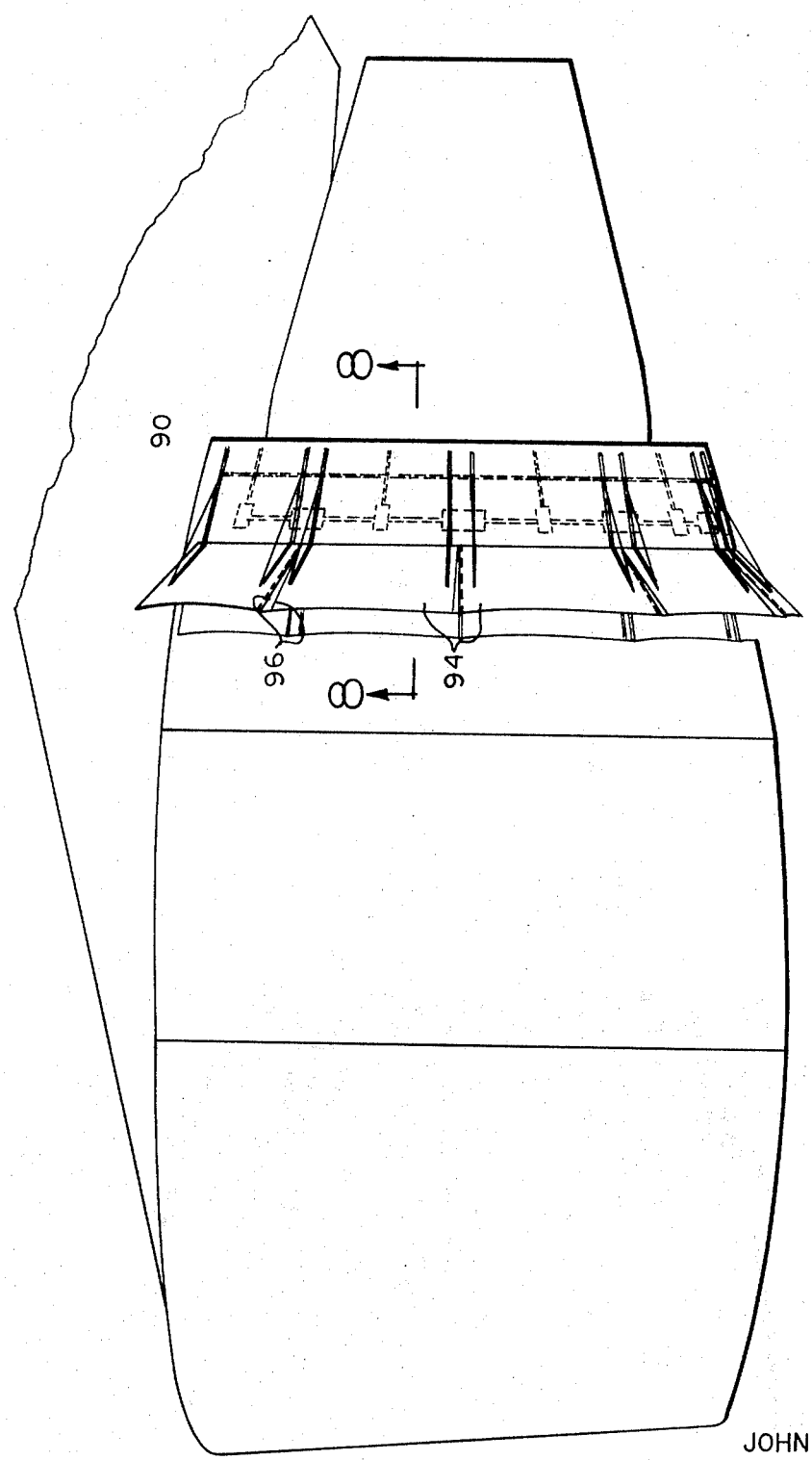
Figure 7:
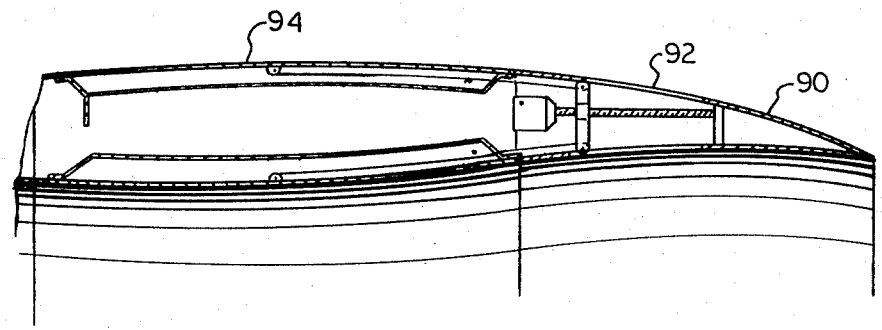
Figure 8:
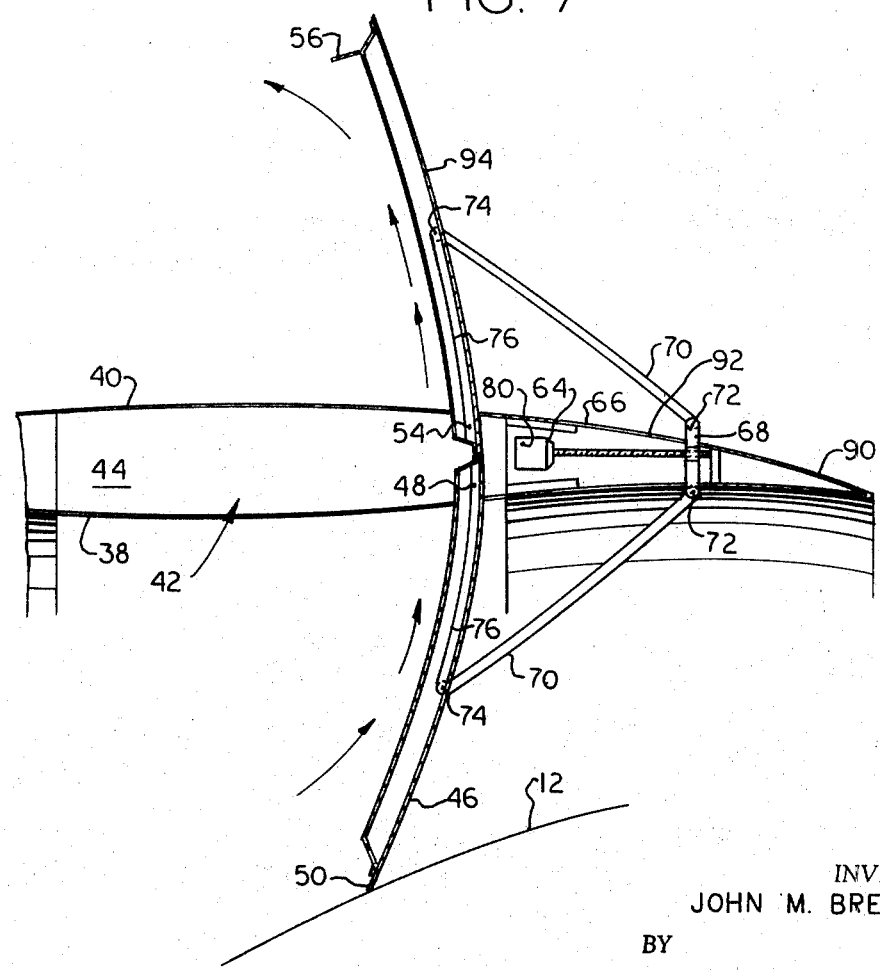

Another difference, illustrated in FIGS. 5 and 6, is that the deflector doors 94 are formed wider at their leading edges than at their trailing edges so that the adjacent side edges 96 overlap in sliding relationship. The overlap is of sufficient extent to insure that when the doors are deployed as in FIG. 6, the side overlap remains and the doors present a continuous wall to prevent any spillage of the deflected jet stream to the rear of the doors.

It will be seen that the apparatus disclosed herein provides a high satisfactory thrust reversal system with relatively few parts which are highly reliable in operation. The absence of actuating mechanism in the outflow passage insures maximum efficiency with no wear and tear on the mechanism, and the modulating controller provides a high degree of safety against hazards in the air and on the ground.

Having thus described the invention, what is claimed as new and useful and is desired to be secured by U.S. Letters Patent is:

1. Thrust reversing apparatus for use in combination with a jet engine enclosed in a core cowl and having a fan driven by the engine to produce a propulsion air stream, comprising: a streamlined shroud surrounding the engine and fan and having inner and outer walls radially spaced from each other throughout at least the major portion of the length of the shroud; the inner wall of the shroud being radially spaced from the engine cowl to define therewith a generally annular duct for rearward flow of the propulsion air stream delivered by the fan; peripherally arranged outflow passage means downstream of the fan extending through the inner and outer walls of the shroud forward of its trailing edge for radially lateral flow of the jet air stream during reverse thrust operation; and a plurality of sets of control doors arranged in lateral adjacency around the periphery of the shroud and in the passage means; each set including a blocker door and a deflector door; the blocker door of each set being pivotally mounted on a transverse axis at its aft end and swingable between stowed position closing a portion of the passage means at the inner wall of the shroud and deployed position converging forwardly toward the axis of the engine and with its forward end in contact with the cowl; the side edges of the blocker doors engaging each other when fully deployed to prevent rearward flow of fan air through the shroud trailing edge exit, and the doors in combination defining a rearwardly divergent frusto-cone to divert the air stream smoothly and gradually outward to the passage means; the deflector door of each set in stowed position lying outward of the blocker door and closing a portion of the passage means at the outer wall of the shroud, and being pivotally mounted on a transverse axis at its aft end to swing to deployed position diverging forwardly from the axis of the engine; the deflector doors in combination defining a forwardly divergent frusto-cone to further deflect the exiting stream outward with a forward flow component to produce a reverse thrust; and actuator means for each set of doors mounted within the shroud and aft of the pivotal mounting means for the doors and including drive means and axially movable carriage means; servo motor means to operate the drive means; and push-pull links pivotally connected at their aft ends to the carriage means and pivotally connected at their forward ends to the blocker and deflector doors; forward movement of the carriage means causing the links to move the doors to stowed position with the links substantially flush with the doors and the shroud; and rearward movement of the carriage means causing the links to move the doors to deployed, operative position with the links aft of the doors to preclude interference with the outflow of the reverse thrust air stream.

2. Apparatus as claimed in claim 1; the doors being formed with recesses in their exposed surfaces to receive the links completely out of the propulsion and free air streams during normal flight operation.

3. Apparatus as claimed in claim 1; the trailing portion of the shroud aft of the doors being in the form of an annular ring separate from the main body of the shroud and axially movable by the actuator means; the carriage means comprising a part of the trailing portion.

4. Apparatus as claimed in claim 1; each of the deflector doors being provided with an end plate at its outer free end extending angularly away from the inner wall of the door to intercept the diverted propulsion air stream and increase its forward flow component.

5. Apparatus as claimed in claim 1; the servo motor means including two servo motors drivingly connected to each actuator means.

6. Apparatus as claimed in claim 1; the servo motor means comprising a plurality of servo motors within the shroud aft of the doors and arranged around the periphery in alternating relationship with the actuator drive means; all of the servo motors and actuator drive means being connected together by flexible power transmission means to produce a construction in which each actuator drive means is driven by two servo motors, and each servo motor is drivingly connected to two actuator drive means.

7. Apparatus as claimed in claim 1; the side edges of adjacent deflector doors in stowed position overlapping each other peripherally to a sufficient extent to remain in overlapping relation at maximum deployment and present an unbroken deflecting wall to the diverted air stream issuing from the passage means.

8. Apparatus as claimed in claim 1; conductor means extending between a power source and the servo motor means to supply power for stowing and deploying operation of the latter; a servo motor controller interposed in the conductor means to regulate the power supply to the servo motor means and modulate the stowage and deployment of the doors; and a meter to measure the flight air speed; the controller being operatively connected to the meter and acting in response thereto to vary the position of the doors as a function of flight air speed.

9. Apparatus as claimed in claim 8; the response pattern of the controller to the meter being so selected and arranged that the controller will prevent any deployment operation of the servo motor means above a predetermined flight air speed and will cause increasing deployment with speed reduction up to full deployment at a predetermined low speed.

* * * * *